3,342,755
OXIDATION STABLE HALOGEN CONTAINING CATION EXCHANGE RESINS

Calvin Calmon, Springfield Township, Burlington County, Albert H. Greer, Haddonfield, and William Wood, Moorestown, N.J., assignors to Ritter Pfaudler Corporation, a corporation of New York
No Drawing. Filed Jan. 21, 1963, Ser. No. 252,601
17 Claims. (Cl. 260—2.2)

This invention relates to novel synthetic polymeric compositions which are useful in the removal of cations from aqueous solutions, and to a novel process for preparing said compositions. The invention also relates to a method of removing cations from aqueous solutions.

Cation exchange resins, in order to be satisfactory for use in the removal of cations from aqueous solutions, must be substantially insoluble in water, dilute acids and alkalies. They must be capable of resisting physical transformation, such as undue swelling or mechanical disintegration (spalling or shattering of the resin beads and granules), when in contact with a solution they treat. They must also have a high, useful operating capacity for removing cations from aqueous solutions and be capable of being repeatedly regenerated for reuse when they become exhausted. It is also desirable that in addition to a suitable operating capacity, the cation exchange resins have a long and useful life and be resistant to traces of oxidizing agents usually found in water and consisting of oxygen, chlorine and the like.

The available commercial sulfonated cross-linked cation exchange resins are usually prepared from a copolymer of styrene and divinyl benzene, the copolymer being sulfonated with a sulfonating agent, such as sulfuric acid. Such resins fail in various degrees to withstand the degrading effects of oxygen, chlorine and other oxidizing agents usually found in feed waters. One of the explanations which has been offered for the degradation of polystyrene resins by an oxidizing agent is that a weak link exists in the polymer at the tertiary carbon adjacent to the benzene ring of the styrene moiety of the polymer. The weakness of the link is believed to be primarily due to the tendency of oxygen and other oxidizing agents to form hydroperoxides with the hydrogen on the tertiary carbon. The hydroperoxides subsequently split the carbon chain to form lower molecular weight degradation products, accompanied by a gradual reduction in the degree of cross-linking in the resin.

The reduction in the degree of cross-linking results in a gradual increase in the volume of the resin, an increase in the resistance to the fluid flow of aqueous solutions through the resin, a softening of the resin to a near-gelatinous mass, and, finally, dissolution of the resin. During the degrading of the resin the operating capacity of the resin, or its useful capacity for removing cations from aqueous solutions, diminishes.

Attempts have been made to improve the oxidation stability of sulfonated cross-linked polystyrene cation exchange resins by increasing the amount of cross-linking agents from that normally used, 7.5 to 12% of divinyl benzene based on the total weight of monomers, to the higher amount of 12 to 20% divinyl benzene, based on the total weight of monomers. Other attempts to increase oxidation stability have included increasing the degree of cross-linking combined with the use of processes for producing microporous or macroreticular resins. The cation exchange resins which were made with a higher degree of cross-linking had only slightly reduced rates of the lowering of the de-cross-linking by oxidizing agents, but their operating capacity was considerably lower than the conventional sulfonated cation exchange resins.

Another means of increasing oxidation stability of the sulfonated cross-linked polystyrene cation exchange resins was the use of solvents during the polymerization process which acted as precipitants for the polymer formed. The polymer formed is called a microporous or macroreticular resin and requires a high degree of cross-linking in order to attain a cation exchange resin which has the normally required hydraulic and physical properties, such as density, hydraulic pressure, etc. While these materials have an increased oxidation stability, they are of reduced value because of their lower operating capacities which decrease rapidly with continued use.

It is an object of the present invention to provide novel cation exchange resins which, while possessing all of the essential properties of a successful cation exchange resin, possess an unusually high oxidation stability.

It is an additional object to provide a novel process for producing cation exchange resins having improved oxidation stability.

It is a further object of this invention to provide a novel process for the removal of cations from aqueous solutions by the use of cation exchange resins having unusually high oxidation stability.

It is a further object of the present invention to provide novel cation exchange resins which, while possessing all of the essential properties of successful cation exchange resins, possess an unusually high stability against the degradative effects of oxidizing agents present in feed waters in the processes of softening and demineralizing aqueous solutions.

Other objects will be apparent to those skilled in the art from reading the following description.

The novel cation exchange resins of this invention are produced by first forming a copolymer of a monovinyl aromatic hydrocarbon monomer and a polyvinyl cross-linking agent. The copolymer is preferably formed in an aqueous medium by a suspension polymerization technique. Elevated temperatures, suitable polymerization catalysts, proper agitation conditions and the like which are well-known in the cation exchange resin art, are used to produce a copolymer bead or granule of a size that upon sulfonation results in particles between about 10 and 60 mesh, and preferably between about 20 and 40 mesh, U.S. Standard screen series. The copolymer bead or granule after washing and drying under suitable conditions is desirably treated with a swelling agent that does not take part in the subsequent reactions, but which causes the copolymer bead to swell so that a uniform reaction can subsequently proceed.

The resultant swollen copolymer is then halogenated under reaction conditions well known in the halogenation art which facilitate substitution of halogen for hydrogen on the polyalkylene side chain and which preferably facilitate the substitution of halogen for hydrogen on the tertiary carbon on the polyalkylene side chain. By polyalkylene side chain is meant the polyethylene connecting chain between the aromatic groups of the copolymer. By tertiary carbon is meant a carbon atom in a polyalkylene chain directly connected to an aromatic moiety which carbon atom has one replaceable hydrogen atom.

Subsequent to halogenation the treated copolymer is sulfonated while still in the swollen state and the sulfonated resin is then recovered. The sulfonation and recovery may be carried out by means well known in the art.

More specifically, the copolymer is prepared by reacting a monovinyl aromatic hydrocarbon with a polyvinyl cross-linking compound containing at least two vinylidene groups which will copolymerize with the monovinyl aromatic hydrocarbon in the presence of a catalyst. The catalysts useful in the practice of this invention are the free radical generating catalysts, such as azobisisobutyronitrile, and include the oxidizing catalysts, such as oxygen, organic peroxides, such as benzoyl peroxide, lauroyl peroxide, tertiary alkyl peroxide, and the like. Other catalysts may be employed successfully. The catalyst is preferably used in amounts from between about 0.05 to 5 parts per hundred parts of total monomer. The polymerization may be conducted in an aqueous emulsion or suspension or in an inert organic solvent.

The monomers useful in the practice of this invention include the aromatic monovinyl monomers known to be useful in preparing cation exchange resins, such as styrene, vinyltoluene, ethylstyrene, vinylnaphthalene, and the like. The monomers are desirably used in amounts between about 80 and 99% by weight of the copolymers and preferably in the range of 88 to 93% by weight of the copolymers.

The cross-linking agents useful in this invention include all cross-linking agents known to be useful in the preparation of cation exchange resins. Desirably, these are polyvinyl, preferably divinyl and trivinyl, aromatic, aliphatic and heterocyclic compounds including divinyl benzene, divinyl toluene, divinylxylene, divinyl naphthalene, divinyl pyridine, ethyleneglycoldimethacrylate, ethyleneglycoldiacrylate, divinylethylbenzene, divinylsulphone, divinylketone, divinylsulphide, aryl esters, such as divinylacrylates, divinylfumarates, divinyloxylates, and the corresponding trivinylidene compounds, such as trivinylbenzene, trivinylcitrate, trivinylaconitate and trivinylphosphates, and the like. The cross-linking agent is desirably used in amounts between about 1 and 20% by weight of the total weight of copolymers. However, it is preferred that the amount used should be in the range between 7 and 12% by weight of the total weight of copolymers.

The swelling agent may be any material which neither reacts with the copolymer nor with the halogenation agent nor with the sulfonating agent, and which will swell the copolymer being used. Suitable swelling agents include such organic solvents as benzene, toluene, xylene, ethylbenzene, isopropylbenzene, chlorobenzene, and the like. The preferred swelling agents are the chlorinated aliphatic hydrocarbons, such as carbon tetrachloride, ethylene dichloride, propylenedichloride, tetrachloroethane, tetrachloroethylene and chloroform. The swelling agent is used to facilitate the penetration of the halogenating medium into the core of the bead or granule particle so that a uniform reaction may be obtained throughout the mass of the copolymer. Preferably aromatic swelling agents when used are removed prior to sulfonation and replaced with chlorinated aliphatic swelling agents.

It is essential to improved oxidation stability that the halogenation of the swollen copolymer be conducted under conditions that facilitate the substitution of halogen in the side chain polystyrene moiety of the polyvinyl copolymer. Preferably substitution by the halogen takes places on the tertiary carbon of the polyalkylene chain attached to the aromatic ring. The halogenating agents used and the conditions of their use are those which are known in the art to predetermine the direction of the substitution. Indicative of the art is Organic Chemistry, Paul Karrer, vol. II, p. 417, Elsevier Publishing Co., New York, 1950.

Surprisingly, it has been found that halogenating agents which will produce an oxidation stable resin are limited to elemental chlorine and bromine and their chlorine or bromine containing derivatives, such as sulfuryl chloride, phosphorus trichloride, phosphorus pentachloride, phosphorus oxychloride, trichloromethylsulphenyl chloride, t-butyl hypochlorite, N-chloro phthalimide, N-bromo phthalamide, phosphorus tribromide, sulfuryl bromide and the like.

Also surprisingly, it has been found that it is possible to improve oxidation stability of the product resins without completely substituting all of the tertiary hydrogen or all of the hydrogen of the polyalkylene side chain. It has been found that in order to effect the optimum stability of the resulting sulfonated resin the percentage of halogen in the polymer prior to sulfonation should be between about 0.1 and 15% by weight of the copolymer. Where elemental chlorine and bromine are used as the halogenating agents the halogen content prior to sulfonation is preferably between 2 and 14% by weight of the copolymer. This range of halogen substitution is well below the stoichiometric amount of halogen necessary to completely substitute all of the tertiary hydrogen. The halogen content is only slightly affected by sulfonation.

It has been found that the molar ratio of the halogenating agent to the cross-linked copolymer which produces oxidation stable resins is desirably between about 0.01 and 5.0, with the optimum molar ratio lying between about 0.05 and 3.0.

It has been found that where a free radical-producing catalyst is used in conjunction with a halogenating agent, the mole percent ratios of the catalyst to the halogenating agent which improve the stability of the final sulfonated resin are between about 0.05% and 2.0%. The optimum mole percent values in such cases are between about 0.5 and 1.5%.

The halogenation is desirably carried out at temperatures between about 20° C. and 100° C. The preferred operating temperature where elemental halogenating agents are used is between about 20 and 80° C. Where other halogenating agents are used the preferred halogenation temperature is between about 50 and 100° C.

The halogenation step using elemental halogenating agents is usually completed in about 2 to 10 hours. Where other halogenating agents are used, the halogenation step is usually complete in about one-half to six hours. The optimum halogenation time in the latter case is between about one-half to four hours.

It has been found desirable when carrying out the halogenation step with elemental chlorine or bromine to use a free-radical producing catalyst, such as, ultra violet light, oxygen peroxides, azobisisobutyronitrile and the like. If the free radical catalysts are not used in conjunction with elemental chlorine and bromine halogenation, unstable resins frequently result after sulfonation. Without wishing to be bound by a theory of operation, it is well known in the art that the reaction of a halogenating agent, such as chlorine and bromine, with an alkyl substituted benzene material will, in the absence of free radical promoters, produce predominantly nuclear substituted halogen derivatives, which the present invention seeks to avoid.

It has been found possible to perform the halogenating reaction without the use of a separate swelling agent. It has been found that a liquid halogenating agent, such as sulfuryl chloride, sulfuryl bromide, phosphorus oxychloride, phosphorus trichloride, and the like can act as its own swelling medium in producing uniform halogenation of the cross-linked polymer. However, it is difficult and costly to handle large amounts of halogenating agents. Furthermore, the amounts of halogenating agents required to impart fluidity to the polymer suspension exceed the preferred mole percent range of halogenating agents, and it has been found that the final sulfonated resin does not have optimum stability toward oxidation.

The sulfonation step may be conducted by employing a weight ratio of a sulfonating agent, such as sulfuric acid, to copolymer of desirably between about 3:1 and 7:1, with the optimum ratio being between about 4:1 and 5:1. The sulfonation medium is preferably fluid and sufficiently concentrated so that a high degree of substitution takes place. The sulfonation step may be carried out at temperatures between about 80 and 120° C. and within a time interval of between about four and ten hours. After sulfonation the resin may be removed from the sulfonation medium by filtration, decantation or addition of water and the like to gradually dilute the sulfonating agent at a rate which minimizes the splitting and spalling of the resin beads.

The cation exchange resins of this invention may be used to treat aqueous solutions by bringing the aqueous solutions into contact with the cation exchange resins.

In order more clearly to disclose the nature of the present invention, specific examples of the practice of the invention are hereinafter given. It should be understood, however, that this is done solely by way of example and is intended neither to delineate the scope of the invention nor limit the ambit of the appended claims.

EXAMPLE I

A. *Preparation of copolymer.*—A copolymer was prepared by a standard suspension technique. To about 800 ml. of water at 50–80° C. there was added a solution of 390.5 g. of commercial styrene, 2.4 g. of benzoyl peroxide and 59.5 g. of commercial divinylbenzene solution containing 53.5% by weight of divinylbenzene and 46.5% by weight of ethylvinylbenzene. The divinylbenzene content was equivalent to 8% of the weight of the styrene. The mixture was stirred at 50–80° C. for twelve hours when polymerization became complete. The resulting product was filtered, washed with water, and dried at 110–130° C. for 3–5 hours.

B. *Halogenation of the copolymer.*—One hundred grams (100 g.) of the cross-linked copolymer were suspended in 200 ml. of carbon tetrachloride in a 3-neck flask equipped with a stirrer, gas inlet tube and a thermometer. Through the gas inlet tube 61 g. of elemental chlorine gas were bubbled into the stirred mixture while the flask were irradiated with ultra-violet light. The temperature was maintained at 80° C. for 8 hours; at the end of that time the resin was filtered, washed with heptane and dried at 55° C. for 3 hours. The chlorine content was found to be 11.2% by weight of the copolymer. The major portion of the chlorine was determined to be in the polyalkylene side chain of the polystyrene moiety by a modification of the method described in J. of Polymer Science., vol. 16, p. 447 (1955).

C. *Sulfonation of the halogenated copolymer.*—The sulfonation of the chlorinated cross-linked polystyrene was conducted by employing a 5:1 weight ratio of 99% sulfuric acid to 100 g. of treated polymer. The polymer was swollen in propylene dichloride, heated to approximately 80–90° C., and the sulfuric acid added during a period of 3 hours. The sulfonation was continued at a temperature of 80–100° C. for an additional 3 hours. After the sulfonation period the mixture was cooled, excess sulfuric acid removed from the resin, and the resin washed with water. After conversion of the resin to the sodium form with a sodium hydroxide solution, it was found that the salt splitting capacity of the resin was 34.9 kilograins per cubic foot (kgr./cu. ft.) and the material had a density of 468 g. per liter. The resin was found to have a 10% expansion when contacted with 50% peroxide at 80° C. for 3 hours. When heated at 80° C. for 3 hours in the presence of 40 mg. of iron per liter of wet resin and 50% peroxide, the expansion increased to 40% of the original volume.

A sample of the copolymer prepared as above and sulfonated as above without halogenation was exposed to the same peroxide tests under the same conditions described above. It was found that in the absence of iron, the material expanded about 15% in a 50% peroxide solution at 80° C. after three hours. In the presence of 40 mg. of iron per liter of wet resin, the nonhalogenated resin completely dissolved in the peroxide in less than three hours.

EXAMPLE II

One hundred grams (100 g.) of a copolymer of styrene and divinylbenzene were prepared as in Example I except that the divinylbenzene content comprised 10% of the weight of styrene. The copolymer was suspended in 200 ml. of carbon tetrachloride, and elemental bromine, weighing 11.1 g. (0.075 mole ratio to the copolymer) was added at one time with stirring. The mixture was then irradiated with an ultra-violet lamp for two and one-half hours at room temperature at which time all of the bromine had reacted as evidenced by the disappearance of its characteristic red color. The mixture was then filtered from the suspending medium and washed with propylene dichloride and dried. The bromine content upon analysis was found to be 6.2% of the weight of the copolymer.

The dried resin was then suspended in a suitable quantity of propylene dichloride and sulfonated with 99% sulfuric acid in the same manner as in Example I. The resin after conversion to the sodium form had a sodium chloride value of 37.1 kgr./cu. ft. as calcium carbonate, and a density of 405 g. per liter. The results of tests of oxidation stability are shown in Table I below.

EXAMPLE III

A styrene-divinylbenzene copolymer containing 10%, by weight of the styrene, of divinylbenzene was prepared according to the procedure of Example I. Then 500 g. of the copolymer were suspended in 1 liter of propylene dichloride. The suspension was heated to 69° C., and 102.5 ml. of distilled sulfuryl chloride (0.27 mole ratio to the copolymer) were added at once, and the mixture heated under reflux for 8 hours. The unreacted sulfuryl chloride was stripped from the reaction mixture by heating to 95° C. The chlorinated polymer was washed thoroughly with propylene dichloride and acetone. Upon analysis the resin was found to contain 8.5% of chlorine, by weight of copolymer, in the side chain.

The chlorinated copolymer was suspended in propylene dichloride and sulfonated according to the procedure of Example I. The resin was converted to the sodium form and had a salt splitting value of 39.1 kgr./cu. ft. and a density of 467 g. per liter. The oxidation stability of the sulfonated material was determined and is shown in Table I below.

EXAMPLE IV

Three hundred grams (300 g.) of polystyrene cross-linked copolymer containing 10% by weight of the styrene, of divinylbenzene were prepared as in Example I. The copolymer was suspended in 735 ml. of propylene dichloride and heated to 69° C. At once 76.5 ml. (0.338 mole ratio to the copolymer) of sulfuryl chloride were added and the mixture stirred at 69° C. for one hour. The unreacted sulfuryl chloride was removed by distillation. A sample of the polymer was removed from the mixture and after washing and drying was found to contain 10.5% chlorine by weight of copolymer.

The remainder of the chlorinated polymer was sulfonated by the procedure used in Example I, except that 93% sulfuric acid was used in a weight ratio of 5:1 of sulfuric acid to the original weight of polymer. The sulfonated resin had a salt splitting capacity of 35 kgr./cu. ft. and a density of 416 g. per liter. The results of tests of oxidation stability are shown in Table I below.

EXAMPLE V

One hundred grams (100 g.) of polymer composed of styrene and 10% by weight of the styrene, of divinylbenzene were prepared according to the procedure of Example I. The copolymer was suspended in 245 ml. of propylene dichloride and the suspension heated to 80° C. Next 3.56 ml. (0.075 mole ratio based on the weight of copolymer) of elemental bromine and 1.1 g. of azobis-isobutyronitrile were added to the mixture at one time. With constant stirring the mixture was heated to 80° C. for four hours. At the end of this time a sample of the polymer, free from solvent, was found to contain 3.9% bromine by weight of copolymer, the major portion being in the side chain.

The remainder of the material was sulfonated with a

5:1 weight of 93% sulfuric acid at 97° C. in the presence of propylene dichloride according to the procedure of Example I. The sulfonated resin after removal from the sulfonation medium and conversion to the sodium form was found to have a salt splitting capacity of 35.3 kgr./cu. ft. as calcium carbonate, and a density of 445 g. per liter. The oxidation stability of the material was determined and is shown in Table I below.

EXAMPLE VI

One hundred grams (100 g.) of a cross-linked copolymer were prepared from styrene and 10% of divinylbenzene by weight of the styrene, according to the procedure of Example I. The copolymer was suspended in 245 ml. of benzene and the temperature raised to 69° C. Technical sulfuryl chloride, 25.5 ml. (0.34 mole ratio based on the copolymer) were added at once. The mixture was stirred and heated for one hour at 69° C. A sample of the polymer was removed, washed and dried, and found to contain 2.3% chlorine by weight of copolymer, mainly in the side chain.

The remainder of the material was filtered free of benzene and added to 200 ml. of propylene dichloride and was sulfonated with 93% sulfuric acid in a weight ratio of five parts of sulfuric acid to one part of the original dry polymer by the procedure of Example I. The final material had a salt splitting capacity of 36 kgr./cu. ft. and a density of 428 g. per liter. The oxidation stability was determined and is shown in Table I below.

EXAMPLE VII

One hundred grams (100 g.) of a cross-linked copolymer of styrene and 10% by weight of styrene, of divinylbenzene were prepared as described in Example I. The copolymer was suspended in 245 ml. of propylene dichloride and heated to 90° C. At once 25.6 ml. (0.32 mole ratio to the copolymer) of phosphorus trichloride were added and the mixture stirred at 90° C. for four hours. A sample of the polymer was removed from the reaction medium, washed and dried, and found to contain 3.9% chlorine by weight of copolymer.

The remainder of the chlorinated copolymer was then sulfonated according to the method described in Example I. The final sulfonated copolymer had a salt splitting capacity of 39.4 kgr./cu. ft. as calcium carbonate, and a density of 428 g. per liter. The oxidation stability of the product is shown in Table I.

EXAMPLE VIII

One hundred grams (100 g.) of a cross-linked copolymer containing styrene and 10%, by weight of styrene, divinylbenzene were prepared by the procedure of Example I. The copolymer was suspended in 245 ml. of propylene dichloride and heated to 90° C. At once 25.6 ml. (0.32 mole ratio based on the copolymer) of phosphorus trichloride and 0.52 g. of azobisisobutyronitrile were added and the mixture heated with stirring at 90° C. for four hours. A sample of the polymer was removed, washed and dried, and found to contain 4.3%, by weight of copolymer, of chlorine substituted mainly in the side chain.

The balance of the material was sulfonated with a 5:1 weight of 93% sulfuric acid using the procedure of Example I. The material after isolation, washing and conversion to the sodium form, was found to have a salt splitting capacity of 40.7 kgr./cu. ft. as calcium carbonate, and a density of 436 g. per liter. The oxidation stability of the material is shown in Table I below.

EXAMPLE IX

One hundred grams (100 g.) of a cross-linked copolymer containing styrene and 10%, by weight of styrene, divinylbenzene were prepared according to the procedure of Example I. The copolymers was suspended in 245 ml. of propylene dichloride and heated to 90° C. At once 53.4 ml. (0.66 mole ratio based on the copolymer) of phosphorus trichloride were added and the mixture heated at 90° C. for four hours. A sample of the material was removed, washed and dried, and found to contain 3.3% chlorine by weight of copolymer, substituted mainly in the side chain.

The remainder of the chlorinated copolymer was then sulfonated with a 5:1 weight of 93% sulfuric acid using the procedure of Example I. After extraction, washing and conversion to the sodium form, the product was found to have a salt splitting capacity of 40.5 kgr./cu. ft. as calcium carbonate, and a density of 462 g. per liter. Oxidation stability test results are shown in Table I below.

EXAMPLE X

One hundred grams (100 g.) of a cross-linked copolymer were prepared as in Example I from styrene and 10%, divinylbenzene by weight of styrene. The copolymer was suspended in 245 ml. of carbon tetrachloride containing 3.4 g. of benzoyl peroxide. To the suspension there were added 30.5 g. (0.17 mole ratio based on the copolymer) of trichloromethane sulfenyl chloride. The mixture was refluxed for six hours and then allowed to stand overnight at room temperature. An additional 3 g. of benzoyl peroxide were added and the mixture again heated to reflux for six hours. A sample of the chlorinated polymer was removed from the reaction medium and upon analysis was found to contain 10.9% chlorine by weight of copolymer, substituted mainly in the side chain.

The chlorinated copolymer was then sulfonated with a 5:1 weight of 93% sulfuric acid according to the procedure of Example I. The material, after removal from the sulfonating medium, was washed, converted to the sodium form, and found to have a salt splitting capacity of 38.2 kgr./cu. ft. and a density of 434 g. per liter. The oxidation stability of the product is shown in Table I.

The oxidation stability of (1) commercially available resins, (2) nuclear halogen substituted resins and, (3) the resins prepared from the examples above was determined by a modification of the accelerated stability test reported by W. Wood in the Journal of Physical Chemistry, vol. 61, p. 832 (1957). Wood describes a method for the determination of the stability of cation exchange resins toward oxygen by an accelerated method in the presence of concentrated hydrogen peroxide. He also states that certain metals, such as copper and iron, act as accelerating catalysts of oxidation and a stability curve can be obtained in a relatively short time by their use.

The accelerated oxidation stability test used in evaluating the examples was applied to the sulfonated resins. Preferably the tested resins contain mostly plus 20 and plus 30 mesh (U.S. Standard screen series) particle size. Any residual iron in the sulfonated resins was stripped by extraction with a 1:1 volume ratio of concentrated hydrochloric acid and water until the extractant shows no trace of iron by a thiocyanate test. Ten milliliters of the extracted resin were then washed with demineralized water and placed in a test tube with 35 ml. of fresh 50% by weight hydrogen peroxide solution containing various concentrations of ferric chloride as the oxidation catalyst. The amount of ferric chloride used was calculated in terms of milligrams of iron per liter of wet resin. A known volume of mixture containing the peroxide-iron solution and the resin was heated to 80° C. for three hours, after which the increase in volume of the resin was noted. The percentage change in volume, or percent swelling, was recorded. The results appear in Table I below.

In Table I resin A is a commercially available, sulfonated polystyrene-diviylbenzene copolymer, containing 8–10% by weight divinylbenzene in the copolymer. Resin B is a commercially available, sulfonated polystyrene-divinylbenzene copolymer containing about 12.5% divinylbenzene by weight. Resin C is a commercially available, sulfonated polystyrene-divinylbenzene copolymer containing about 15% divinylbenzene by weight.

Resin D in the table is a copolymer containing nuclear substituted halogen. Resin D was prepared by the following procedure. Using a commercial divinylbenzene cross-linking solution containing 57.5% by weight of divinylbenzene and 42.5% by weight of ethylvinylbenzene, a mixture of 22.3 g. of divinylbenzene solution, 50 g. of orthochlorostyrene, 55.7 g. of commercial styrene, and 0.77 g. of benzoyl peroxide was added to 256 ml. of water at 90° C. The suspension was stirred overnight at 90° C. The resulting polymer was filtered, washed with hot water and dried at 130° C. for three hours. Upon analysis the nuclear chlorine content of the resin was found to be 8.1%. One part of the dry polymer was sulfonated by heating to 97° C. in the presence of propylene dichloride with five parts of 99% sulfuric acid added during three hours and heating continued for an additional three hours. After cooling, the resin was filtered free of sulfuric acid, washed with water and converted to the sodium form with sodium hydroxide.

In some instances the resin dissolved. This is indicated in the table by S.

Table I illustrates the improved oxidation stability of the products of this invention.

TABLE I.—OXIDATION STABILITY DETERMINATION

| Material | Halogen | Mole Ratio | Percent Halogen | Percent Swelling — Ferric Ion Concentration in mg./l. of Wet Resin | | | | | | | | | |
|---|---|---|---|---|---|---|---|---|---|---|---|---|---|
| | | | | 0 | 40 | 50 | 100 | 150 | 200 | 225 | 250 | 300 | 450 | 500 |
| Resin A | None | | | 5 | | 80 | 130 | 210 | | S | | | | |
| Resin B | do | | | 10 | | 30 | 70 | | S | | | | | |
| Resin C | do | | | 10 | | 20 | 45 | 80 | 280 | S | | | | |
| Resin D | Nuclear | | 8.1 | 10 | | 50 | 170 | | S | | | | | |
| Example I | None | | | 15 | S | | | | | | | | | |
| Do | Cl₂+U.V | | 11.2 | 10 | 40 | | | | | | | | | |
| Example II | Br₂+U.V | 0.075 | 6.2 | 10 | | 11 | 15 | 30 | 35 | | | | | |
| Example III | SO₂Cl₂ | 0.27 | 8.5 | 5 | | 25 | 45 | 90 | 150 | | | | | |
| Example IV | SO₂Cl₂ | 0.338 | 10.5 | 0 | | 30 | 50 | 70 | 80 | | | | | |
| Example V | Br₂+azo | 0.075 | 3.9 | 10 | | | | 50 | 140 | 150 | 220 | | | |
| Example VI | SO₂Cl₂ | 0.34 | 2.3 | 5 | | | | 40 | 70 | 95 | | S | | |
| Example VII | PCl₃ | 0.32 | 3.9 | 5 | | | | 20 | 30 | 45 | 50 | | | |
| Example VIII | PCl₃+azo | 0.32 | 4.3 | 5 | | | | 25 | 25 | 30 | 45 | | | |
| Example IX | PCl₃ | 0.66 | 3.3 | 10 | | 10 | 10 | | 30 | 30 | 40 | 50 | 60 | |
| Example X | CCl₃SO₂Cl+Bz₂O₂ | 0.17 | 10.9 | 0 | | | | 6 | | S | | | | |

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. For instance, in Examples I–X the styrene may be replaced by any aromatic monovinyl monomers which are useful in preparing cation exchange resins, such as vinyl toluene, ethylstyrene, vinylnaphthalene and the like. Similarly in the examples the divinylbenzene may be replaced by divinyltoluene, divinylxylene, divinylnaphthalene, divinylpyridine, ethyleneglycolmethacrylate, ethyleneglycoldiacrylate, divinylethylbenzene, divinylsulphone, divinylketone, divinylsulfide, divinylacrylates, divinylfumarates, divinyloxalates, trivinylbenzene, trivinylcitrate, trivinylaconitate, trivinylphosphates and the like.

What is claimed is:

1. A process for producing cation exchange resins having improved oxidation stability consisting of the steps of treating a copolymer of a monovinyl aromatic hydrocarbon monomer and a polyvinyl cross-linking compound with a halogenating agent selected from the class consisting of chlorine and bromine and their chlorine and bromine containing derivatives selected from the class consisting of sulfuryl chloride, phosphorus trichloride, phosphorus pentachloride, phosphorus oxychloride, trichloromethylsulphenyl chloride, t-butyl hypochlorite, N-chloro phthalimide, N-bromo phthalimide, phosphorous tribromide, and sulfuryl bromide, wherein said halogenating is conducted in the presence of a free radical producing catalyst and a liquid swelling agent for said copolymer, whereby substitution of halogen for hydrogen takes place mainly in the polyethylene connecting chain between the aromatic groups of the copolymer; and sulfonating said halogenated cross-linked copolymer.

2. A process according to claim 1 wherein the monovinyl aromatic hydrocarbon monomer is styrene, and the polyvinyl cross-linking compound is divinylbenzene.

3. A process according to claim 1 wherein the halogenation step is carried out with elemental chlorine in the presence of a free radical producing catalyst.

4. A process according to claim 1 wherein the halogenation step is carried out with elemental bromine in the presence of a free radical producing catalyst.

5. A process according to claim 1 wherein the halogenating agent is sulfuryl chloride.

6. A process according to claim 1 wherein the halogenating agent is phosphorous trichloride.

7. A process according to claim 1 wherein the halogenating agent is trichloromethane sulfenyl chloride.

8. A process for producing cation exchange resins having improved oxidation stability consisting of the steps of preparing a copolymer of a monovinyl aromatic hydrocarbon monomer and a polyvinyl cross-linking compound, said copolymer containing polyalkylene tertiary carbon atoms; treating said copolymer with a halogenating agent selected from the class consisting of chlorine and bromine and their chlorine and bromine containing derivatives selected from the class consisting of sulfuryl chloride, phosphorus trichloride, phosphorus pentachloride, phosphorus oxychloride, trichloromethylsulphenyl chloride, t-butyl hypochlorite, N-chloro phthalimide, N-bromo phthalimide, phosphorus tribromide, and sulfuryl bromide, wherein said halogenating is conducted in the presence of a free radical producing catalyst and a liquid swelling agent for said copolymer, whereby halogen is substituted for at least a portion of the hydrogen atoms of said polyalkylene carbon atoms; and sulfonating the halogenated cross-linked copolymer.

9. A process for producing cation exchange resins having improved oxidation stability consisting of halogenating a copolymer of a monovinyl aromatic hydrocarbon and a polyvinyl cross-linking compound, whereby the molar ratio of halogenating agent to copolymer is between about 0.01 and 5.0, and sulfonating the halogenated copolymer wherein said halogenating is conducted in the presence of a free radical producing catalyst and a liquid swelling agent for said copolymer.

10. A process for producing cation exchange resins having improved oxidation stability consisting of halogenating a copolymer of a monovinyl aromatic hydrocarbon monomer and a polyvinyl cross-linking compound, whereby said halogenated product contains between about 0.1 to 15% of halogen by weight, and sulfonating the halogenated copolymer, wherein said halogenating is conducted in the presence of a free radical producing catalyst and a liquid swelling agent for said copolymer.

11. A process according to claim 10 where said halogenation step is carried out at a temperature between about 20 and 100° C.

12. A process according to claim 10 wherein the halogenation step is carried out during a period of between about 30 minutes and ten hours.

13. A resin suitable for sulfonation into a cation exchange resin having improved oxidation stability consisting of a halogenated copolymer of a monovinyl aromatic hydrocarbon monomer and a polyvinyl cross-linking agent formed in the presence of a free radical producing catalyst, a halogenating agent selected from the class consisting of chlorine, bromine, sulfuryl chloride, phosphorus trichloride, phosphorus pentachloride, phosphorus oxychloride, trichloromethylsulphenyl chloride, t-butyl hypochlorite, N-chloro phthalimide, N-bromo phthalimide, phosphorus tribromide, and sulfuryl bromide, and a liquid swelling agent for said copolymer; said halogenated copolymer containing between about 0.1 and 15% by weight of copolymer of a halogen selected from the class consisting of chlorine and bromine, said halogen being contained mainly in the polyethylene connecting chain between the aromatic groups of the copolymer and predominantly on the tertiary carbon atoms.

14. A cation exchange resin having improved oxidation stability consisting of a sulfonated, halogenated copolymer of a monovinyl aromatic hydrocarbon monomer and a polyvinyl cross-linking agent containing between about 0.1 to 15% by weight of copolymer of a halogen selected from the class consisting of chlorine and bromine, said halogen being substituted mainly in the polyethylene connecting chain between the aromatic groups of the copolymer and largely on the tertiary carbon; the halogenation of said copolymer being conducted in the presence of a liquid swelling agent for said copolymer.

15. A water-insoluble sulfonated halogenated copolymer of a monovinyl aromatic hydrocarbon and a polyvinyl cross-linking compound containing in chemically combined form between about 0.1 and 15% halogen by weight of copolymer, said sulfonated halogenated copolymer containing substantial tertiary halogenation, the halogen being selected from the class consisting of chlorine and bromine; the halogenation of said copolymer being conducted in the presence of a liquid swelling agent for said copolymer.

16. A method for removing cations from aqueous solutions containing oxidizing materials which comprises bringing such solutions into effective contact with the cation exchange resin of claim 14 and recovering therefrom an aqueous solution substantially devoid of said cations and the exchange resin in a substantially unoxidized condition.

17. A method for removing cations from aqueous solutions containing oxidizing materials which comprises bringing such solutions into effective contact with the cation exchange resin of claim 15 and recovering therefrom an aqueous solution substantially devoid of said cations and the exchange resin in a substantially unoxidized condition.

References Cited

UNITED STATES PATENTS

| | | | |
|---|---|---|---|
| 2,527,300 | 10/1950 | Dudley | 260—2.2 |
| 2,628,193 | 2/1953 | D'Alelio | 260—2.2 |
| 2,645,621 | 7/1953 | D'Alelio | 260—2.2 |
| 2,733,231 | 1/1956 | Bauman et al. | 260—2.2 |
| 2,764,561 | 9/1956 | McMaster | 260—2.2 |
| 3,009,906 | 11/1961 | Eichhorn et al. | 260—88.2 |

WILLIAM H. SHORT, *Primary Examiner.*

J. C. MARTIN, C. A. WENDEL, M. GOLDSTEIN,
*Assistant Examiners.*